(12) United States Patent
Miyamae (10) Patent No.: US 11,275,862 B2
(45) Date of Patent: Mar. 15, 2022

(54) DATA PROCESSING APPARATUS FOR ASSIGNING AN ACCESS RIGHT TO A FILE LINKED IN A MESSAGE

(71) Applicant: FUJIFILM BUSINESS INNOVATION CORP., Tokyo (JP)

(72) Inventor: Eiji Miyamae, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 156 days.

(21) Appl. No.: 16/400,411

(22) Filed: May 1, 2019

(65) Prior Publication Data

US 2020/0104524 A1 Apr. 2, 2020

(30) Foreign Application Priority Data

Oct. 1, 2018 (JP) .............................. JP2018-186630

(51) Int. Cl.
| | | |
|---|---|---|
| *G06F 21/62* | (2013.01) | |
| *G06F 16/11* | (2019.01) | |
| *G06F 16/13* | (2019.01) | |
| *H04W 12/082* | (2021.01) | |

(52) U.S. Cl.
CPC ........ *G06F 21/6218* (2013.01); *G06F 16/122* (2019.01); *G06F 16/13* (2019.01); *H04W 12/082* (2021.01)

(58) Field of Classification Search
CPC .............. G06F 17/30265; G06Q 10/10; G06Q 10/107; H04L 41/026
See application file for complete search history.

(56) References Cited

U.S. PATENT DOCUMENTS

| | | | |
|---|---|---|---|
| 6,453,327 B1 * | 9/2002 | Nielsen ................ | G06Q 10/107 709/206 |
| 6,795,831 B2 | 9/2004 | Hirose et al. | |
| 9,473,445 B2 | 10/2016 | Sasamoto et al. | |
| 9,514,198 B1 * | 12/2016 | Haugen ................ | G06Q 50/01 |
| 2005/0021938 A1 | 1/2005 | Kidokoro | |
| 2014/0146621 A1 * | 5/2014 | Kim ..................... | G11C 7/1045 365/189.011 |
| 2019/0190863 A1 * | 6/2019 | Baker .................. | H04L 63/101 |

FOREIGN PATENT DOCUMENTS

| | | |
|---|---|---|
| JP | 2002-297883 A | 10/2002 |
| JP | 2005-4763 A | 1/2005 |
| JP | 2006-323738 A | 11/2006 |
| JP | 2014-81782 A | 5/2014 |

* cited by examiner

*Primary Examiner* — Mohammed Waliullah
(74) *Attorney, Agent, or Firm* — Oliff PLC (57) ABSTRACT

A data processing apparatus includes: a monitoring unit that monitors a message from a sender to a user group; an extraction unit that, in a case where the message includes a link to a file, extracts one or more of authorized user groups authorized to access the file; and an update unit that, in a case where the user group that has received the message includes a user who is not authorized to access the file, updates user group information to add the user to one or more of the one or more authorized user groups extracted by the extraction unit.

14 Claims, 8 Drawing Sheets

| GROUP NAME | ACCESS RIGHT | PARTICIPANTS | NOTES |
|---|---|---|---|
| X COLLABORATION GROUP | REFERENCE RIGHT AND WRITE RIGHT FOR COLLABORATION SYSTEM X | USER 1<br>USER 2<br>USER 3<br>USER 4<br>USER 5<br>USER 6 | |
| X COLLABORATION ADMINISTRATION GROUP | REFERENCE RIGHT, WRITE RIGHT, AND ADMINISTRATION RIGHT FOR COLLABORATION SYSTEM X | USER 1<br>USER 2 | ADMINISTRATOR OF COLLABORATION SYSTEM |
| Y COLLABORATION GROUP | REFERENCE RIGHT AND WRITE RIGHT FOR COLLABORATION SYSTEM Y | USER 10<br>USER 11 | PERSON INVOLVED IN CURRENT PRODUCT Y |
| X DOCUMENT REFERENCE GROUP | REFERENCE RIGHT FOR DOCUMENT MANAGEMENT SYSTEM | USER 10<br>USER 11 | REFER TO INFORMATION REGARDING NEW PRODUCT PROJECT X FROM VIEWPOINT OF PERSON INVOLVED IN CURRENT PRODUCT |
| X DOCUMENT ADMINISTRATOR GROUP | REFERENCE RIGHT, WRITE RIGHT, AND ADMINISTRATION RIGHT FOR DOCUMENT MANAGEMENT SYSTEM | USER 1 | DOCUMENT MANAGEMENT ADMINISTRATOR FOR NEW PRODUCT PROJECT X |
| X DOCUMENT GENERAL GROUP | REFERENCE RIGHT AND WRITE RIGHT FOR DOCUMENT MANAGEMENT SYSTEM | USER 2<br>USER 3<br>USER 4<br>USER 5 | DOCUMENT MANAGEMENT GENERAL MEMBER FOR NEW PRODUCT PROJECT X |

FIG. 7

| GROUP NAME | NUMBER OF MEMBERS ALSO PARTICIPATING IN X COLLABORATION GROUP | DESCENDING ORDER OF RELEVANCE |
|---|---|---|
| X DOCUMENT GENERAL GROUP | 4 | 1 |
| X DOCUMENT ADMINISTRATOR GROUP | 1 | 2 |
| X DOCUMENT REFERENCE GROUP | 0 | NOT APPLICABLE |

FIG. 8

DATA PROCESSING APPARATUS FOR ASSIGNING AN ACCESS RIGHT TO A FILE LINKED IN A MESSAGE

CROSS-REFERENCE TO RELATED APPLICATIONS

This application is based on and claims priority under 35 USC 119 from Japanese Patent Application No. 2018-186630 filed Oct. 1, 2018.

BACKGROUND

(i) Technical Field

The present disclosure relates to a data processing apparatus.

(ii) Related Art

Japanese Unexamined Patent Application Publication No. 2002-297883 describes a knowledge information management method for a computer that manages knowledge information shared via a network, the method including: managing a series of speech data exchanged by persons involved in a task aimed at addressing a problem via the network in order to carry out the task, accumulating conversation streams including content of the series of speech data, and sequentially accumulating, when required, objects required to carry out the task in a process from occurrence of the problem to a conclusion; associating a certain conversation stream from among the accumulated conversation streams and a certain object from among the accumulated objects in response to an association request; and outputting information relating to the certain conversation stream and the certain object that have been associated, in response to an associated information acquisition request.

Japanese Unexamined Patent Application Publication No. 2014-81782 describes a speech processing apparatus including: a conversation monitoring unit that monitors speech of each member belonging to a community, in accordance with a conversation log acquired from a conversation mediation server that mediates a conversation carried out with the members using communication terminal apparatuses; a state information collection unit that, in a case where the conversation monitoring unit has detected that a specific keyword has been spoken within a conversation in which a specific member participates, collects state information that indicates an event relating to the community and is designated in association with the specific member and specific keyword detected; and a speech unit that outputs, to the conversation mediation server, a speech message that coincides with the event relating to the community and is indicated by the state information collected by the state information collection unit.

Japanese Unexamined Patent Application Publication No. 2006-323738 describes a program for evaluating a contribution level of a community participant, the program causing a computer, which manages messages exchanged in a virtual community provided on a network, to function as: a message history management unit that records, in a history information storage unit, history information that includes at least a speaker and a speech date and time of each message written to the community; and a contribution level calculation processing unit that calculates the contribution level of each community participant with respect to the community by reading the history information accumulated in the history information storage unit and analyzing the message writing timing of each community participant.

Japanese Unexamined Patent Application Publication No. 2005-4763 describes a document access method including: detecting whether an electronic mail message includes a link to a certain document or site; extracting individual addresses to which the electronic mail is transmitted; if there are no user accounts for the extracted addresses, newly generating user accounts, and if there already are user accounts for the extracted addresses, using the user accounts; setting a right for access that is carried out with respect to each address including at least one or more of the user accounts; and transferring the electronic mail message including the link to the document, to each of the one or more addresses.

SUMMARY

There are cases where a message is transmitted to a recipient who does not have an access right to a file linked from within the message, and in cases such as these, it is necessary for an access right to the file to be assigned to the recipient who does not have an access right to the file.

Aspects of non-limiting embodiments of the present disclosure relate to a data processing apparatus that is able to simplify the assigning of an access right to a file linked from a message to a recipient of the message, compared to a case where messages are not monitored and a user group, to which message recipients who do not have access rights to files are added as participants, is not extracted from information relating to a link extracted from within a message.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a data processing apparatus including: a monitoring unit that monitors a message from a sender to a user group; an extraction unit that, in a case where the message includes a link to a file, extracts one or more of authorized user groups authorized to access the file; and an update unit that, in a case where the user group that has received the message includes a user who is not authorized to access the file, updates user group information to add the user to one or more of the one or more authorized user groups extracted by the extraction unit.

BRIEF DESCRIPTION OF THE DRAWINGS

An exemplary embodiment of the present disclosure will be described in detail based on the following figures, wherein.

DETAILED DESCRIPTION

Figure 1:
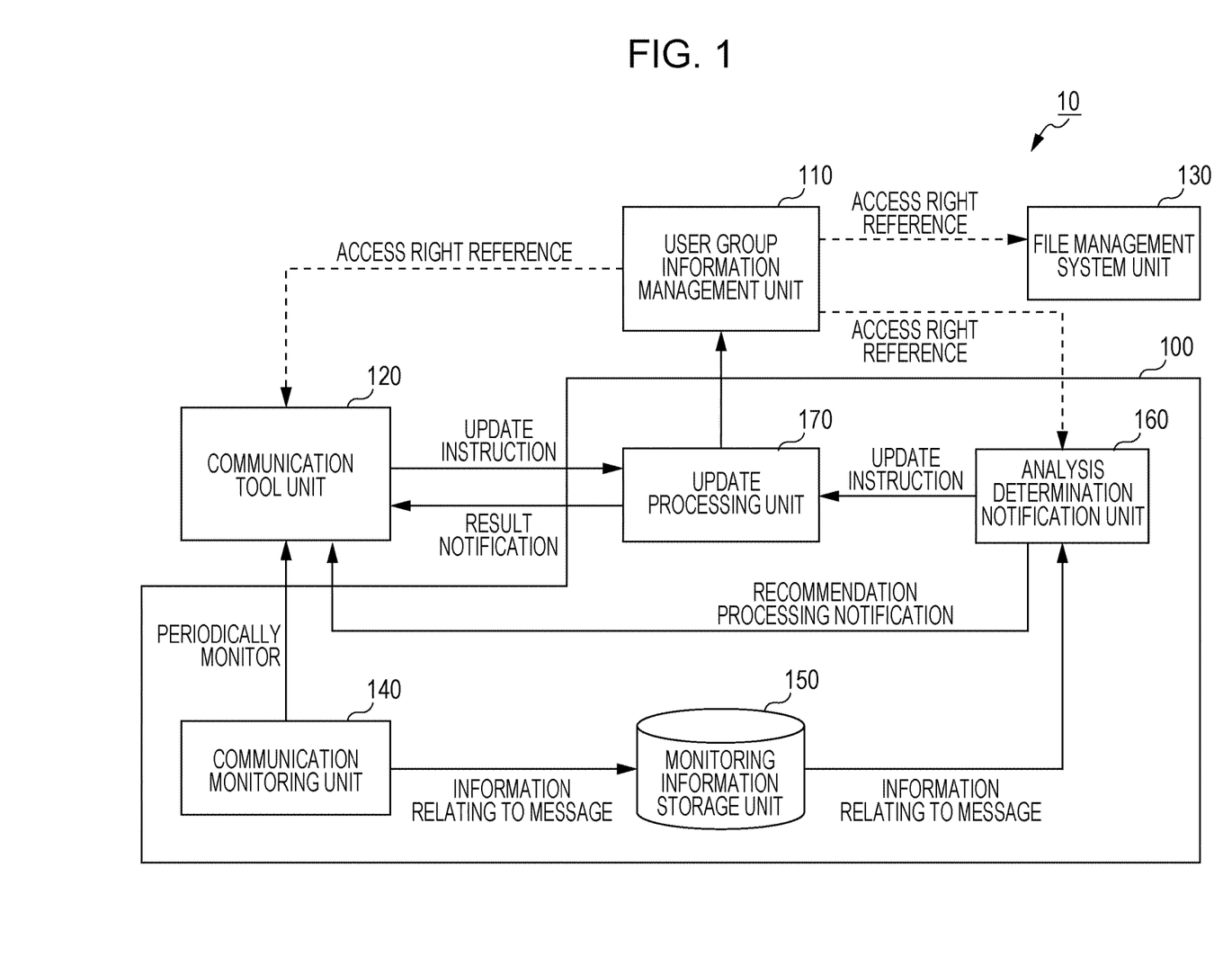
FIG. 1 is a block diagram depicting a configuration of an information processing system according to an exemplary embodiment of the disclosure.

Hereinafter, an exemplary embodiment of the disclosure will be described in detail with reference to the drawings. FIG. 1 is a drawing depicting an information processing system 10 that is an exemplary embodiment of an information processing system according to the disclosure. As depicted in FIG. 1, the information processing system 10 has a user group information management unit 110.

The user group information management unit 110 is an example of a user group management unit, and centrally manages information regarding users and information regarding user groups of a communication tool unit 120 that is described later and a file management system unit 130 that is described later. As the user group information management unit 110, it is possible to use Active Directory from Microsoft or a Lightweight Directory Access Protocol (LDAP) server, for example.

Here, users are persons who use the information processing system 10, and include, for example, senders and recipients of messages for which the communication tool unit 120 is used, and, for example, persons who save documents in the file management system unit 130 and use documents saved in the file management system unit 130. Furthermore, the information regarding a user includes, for example, the name of the user, the email address of the user, an organization to which the user belongs, and the like.

Furthermore, a user group is an assembly of users, in which there may be multiple users or there may be a single user. Furthermore, a possible example of information relating to a user group is the names or the number of users who are participating in the user group. Furthermore, another possible example of information relating to user groups is the access rights or the like of the respective groups to the files managed by the file management system unit 130. A user group which has an access right to a file (that is, a user group which is authorized to access the file) is hereinafter referred to as an access right group.

By managing the information regarding user groups in the manner mentioned above, processing such as assigning the same access right to users participating in the same user group becomes possible, management of the information processing system 10 is simplified, and user management is simplified, for example.

Furthermore, reference is made to the information managed by the user group information management unit 110 from the communication tool unit 120, from the file management system unit 130, and from an analysis determination notification unit 160 that is described later. Furthermore, the information managed by the user group information management unit 110 is updated by an update processing unit 170 that is described later.

In addition, the information processing system 10 has the communication tool unit 120. The communication tool unit 120 is an example of a communication unit, and, for example, enables the transmission of a message from a sender who is one user to a recipient who is another user, and enables communication between multiple users, in cooperation with the user group information management unit 110. Here, a possible example of the communication tool unit 120 is a mail server that transmits and receives electronic mail, which is an example of a message. Furthermore, the messages that are transmitted and received by the communication tool unit 120 are not restricted to electronic mail, and, for example, may be chats, instant messages, or the like.

There are cases where a message transmitted and received using the communication tool unit 120 includes a link to a file managed by the file management system unit 130. In cases such as these, if the recipient of the message does not have an access right to the linked file, an inconvenience occurs in that the recipient of the message is not able to access the linked file.

There are cases where the communication tool unit 120 instructs the update processing unit 170 described later to update information regarding the user groups managed by the user group information management unit 110. Furthermore, there are cases where the communication tool unit 120 receives a notification of the result of updating the information regarding the user groups from the update processing unit 170.

In addition, the information processing system 10 has the file management system unit 130. The file management system unit 130 is an example of a file management unit, and, for example, manages files such as document files in cooperation with the user group information management unit 110. More specifically, the file management system unit 130 refers to access rights, to files, of each user group (of each access right group) managed by the user group information management unit 110, and makes it possible for the users who participate in each user group to register files, browse files, manage files, and so forth in accordance with the access rights to the files. As the file management system unit 130, DocuShare from Fuji Xerox Co., Ltd. or the like can be used, for example.

The information processing system 10 has a data processing apparatus 100, and the data processing apparatus 100 has a communication monitoring unit 140, a monitoring information storage unit 150, the analysis determination notification unit 160, and the update processing unit 170.

The communication monitoring unit 140 periodically monitors messages that are transmitted from a sender to a recipient in the communication tool unit 120, determines whether or not a message is to be monitored from the content of the message, and extracts information that is to be monitored. Here, the determination as to whether or not a message is to be monitored is, for example, based on whether or not a link to a file managed by the file management system unit 130 is included within the message, and, for example, the communication monitoring unit 140 determines that a message is to be monitored in a case where a link to a file managed by the file management system unit 130 is included within the message. Hereinafter, information that is to be monitored by the communication monitoring unit 140 is sometimes referred to as monitoring target information.

The monitoring information storage unit 150 stores and manages monitoring target information extracted by the communication monitoring unit 140. Possible examples of the information stored and managed by the monitoring information storage unit 150 are the transmission date and time of a message, the sender of a message, a user group in which the recipient of a message is participating, a user group in which the sender of a message is participating, and the like. Furthermore, in a case where a link to a file managed by the file management system unit 130 is included within a message, the link to the file managed by the file management system unit 130 can be given as an example of the information managed by the monitoring information storage unit 150.

The analysis determination notification unit 160 is an example of an extraction unit, an example of an update unit, and an example of a notification unit, and analyzes the monitoring target information stored in the monitoring information storage unit 150 and managed by the monitoring information storage unit 150, and, in a case where the recipient of a message does not have an access right to a file linked from within the message, extracts all of the user groups managed by the user group information management unit 110, and determines a user group to be updated, from the information managed by the monitoring information storage unit 150. Here, the updating of a user group, more specifically, refers to the recipient of the message being added to the participants of the user group.

The analysis determination notification unit 160 then issues an instruction (update instruction) to the update processing unit 170 to update the determined user group, in other words, to add the recipient of the message to the participants of the determined user group. Furthermore, instead of the analysis determination notification unit 160 issuing an instruction to the update processing unit 170 to update the user group, the analysis determination notification unit 160 may instruct the communication tool unit 120 to issue a notification recommending the update of the user group (recommendation processing notification). Thereafter, the communication tool unit 120 may issue an instruction to the update processing unit 170 to update the user group.

The update processing unit 170 is an example of an update unit, and updates information regarding a user group managed by the user group information management unit 110, on the basis of an instruction from the analysis determination notification unit 160 or an instruction from the communication tool unit 120. In other words, a recipient of a message who does not have an access right to a file linked from within the message is added to the participants of an access right group who have access rights to the file linked from within the message. Furthermore, the update processing unit 170 notifies the result of the update to the communication tool unit 120 in a case where the user group has been updated.

Figure 2:
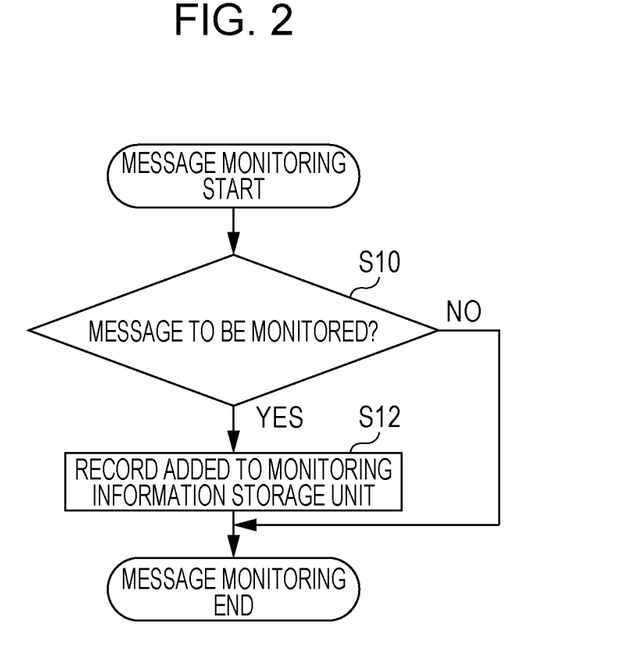
FIG. 2 is a flowchart depicting the monitoring of communication by a communication monitoring unit and the storing of monitoring target information by a monitoring information storage unit.

FIG. 2 is a flowchart depicting the monitoring of communication by the communication monitoring unit 140 and the storing of monitoring target information by the monitoring information storage unit 150. As depicted in FIG. 2, when the monitoring of communication is started, in step S10 which is the first step, the communication monitoring unit 140 monitors whether or not communication carried out by the communication tool unit 120 is to be monitored. Then, in a case where it is determined that the communication is not to be monitored, the communication monitoring unit 140 ends the monitoring of the communication. However, in a case where it is determined that the communication is to be monitored, processing proceeds to step S12.

In step S12, information regarding the communication determined as to be monitored by the communication monitoring unit 140 is stored as monitoring target information in the monitoring information storage unit 150. More specifically, in a case where a link to a file managed by the file management system unit 130 is included within a message, the date and time of the message, the name of the sender of the message, the name of the recipient of the message, the name of a user group in which the sender of the message is participating, the name of a user group in which the recipient of the message is participating, and the link to the file included in the message are stored as information relating to the message in the monitoring information storage unit 150.

Figure 3:
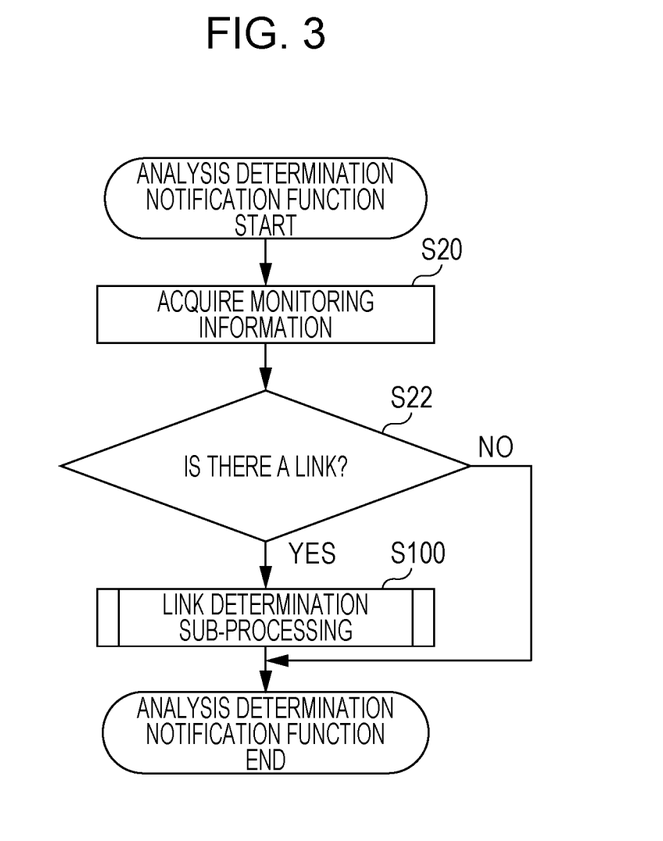
FIG. 3 is a flowchart depicting an analysis determination notification function implemented by an analysis determination notification unit.

FIG. 3 is a flowchart describing an analysis determination notification function implemented by the analysis determination notification unit 160. As depicted in FIG. 3, in step S20, the analysis determination notification unit 160 periodically acquires monitoring target information from the monitoring information storage unit 150.

In step S22 which is the next step, the analysis determination notification unit 160 analyzes the monitoring target information acquired in step S20, and determines whether or not a link to a file managed by the file management system unit 130 is included in a message. Then, in a case where it is determined that a link to a file managed by the file management system unit 130 is not included within the message, the analysis determination notification unit 160 ends the analysis. However, in a case where it is determined that a link to a file managed by the file management system unit 130 is included within the message, processing proceeds to link determination sub-processing of step S100.

Figure 4:
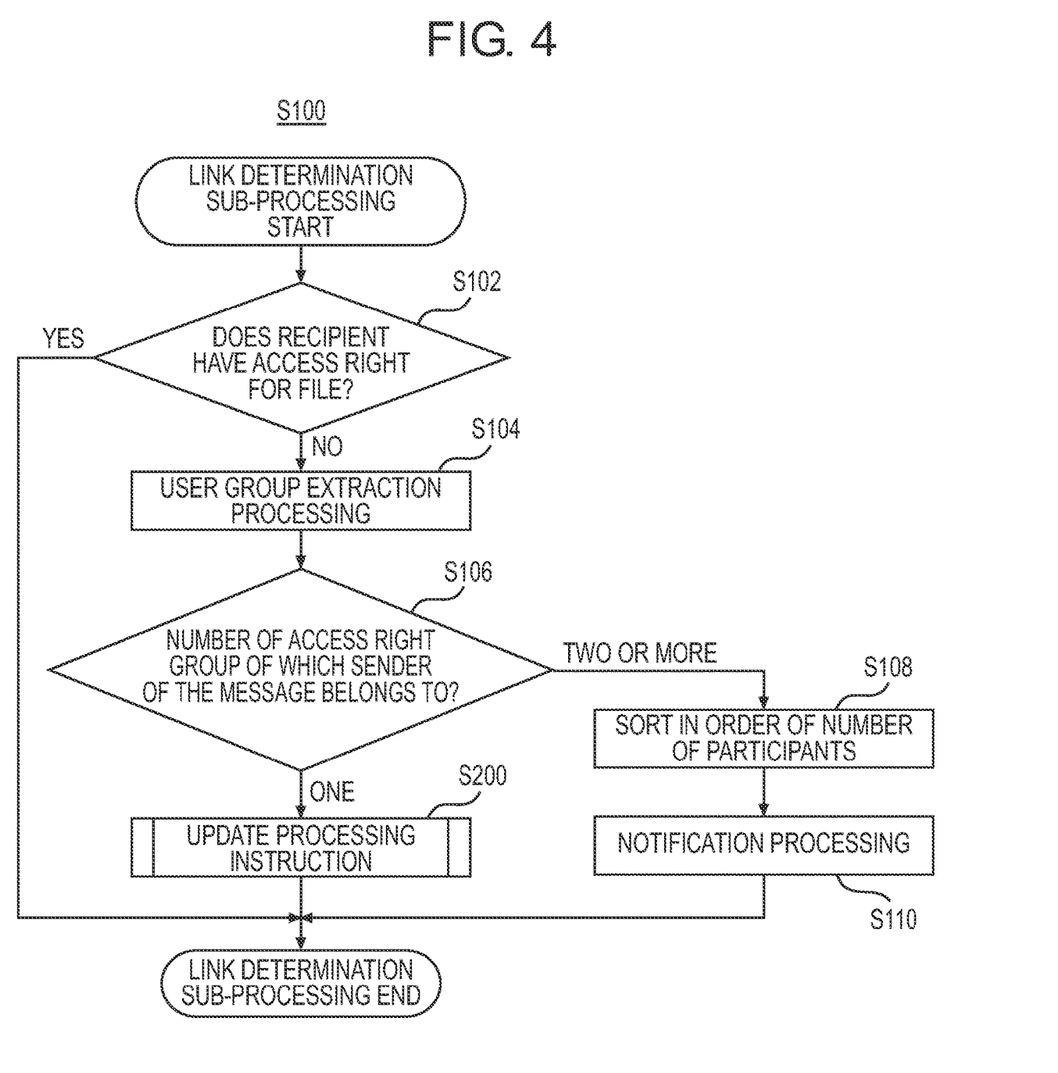
FIG. 4 is a flowchart depicting link determination sub-processing carried out by the analysis determination notification unit.

FIG. 4 is a flowchart depicting the link determination sub-processing of step S100. As depicted in FIG. 4, in step S102, the analysis determination notification unit 160 determines whether or not the recipient of the message has an access right to the file linked from within the message and managed by the file management system unit 130. Then, in a case where it is determined that the recipient of the message has the access right to the file, the link determination sub-processing ends. However, in a case where it is determined that the recipient of the message does not have the access right to the file, processing proceeds to step S104.

In step S104, the analysis determination notification unit 160 acquires, from the user group information management unit 110, access right groups that have an access right to the file linked from the message and managed by the file management system unit 130 and extracts an access right group in which the sender of the message is participating, from among the acquired access right groups.

In step S106 which is the next step, the analysis determination notification unit 160 determines whether there is one or whether there are two or more access right groups that have been extracted in step S104 as access right groups in which the sender of the message is participating. Then, in a case where it is determined that there is one access right group in which the sender of the message is participating, processing proceeds to step S200. However, in a case where it is determined that there are two or more access right groups in which the sender of the message is participating as a member, processing proceeds to step S108.

In step S200, the analysis determination notification unit 160 instructs the update processing unit 170 to update data so that the recipient of the message who does not have an access right to the file at the link destination is added as a participant to the one access right group in which the sender of the message is participating as a member. The details of updating data carried out by the update processing unit 170 will be described later.

In step S108, the analysis determination notification unit 160 determines that the relevance between an access right group and the recipient of the message is high when the access right group has a large number of participants in the user group who are recipients of the message, creates a new list in which the access right groups extracted in the step S104 are sorted in descending order of the number of participants in the user group who are recipients of the message, and temporarily saves the created list of access right groups.

In step S110 which is the next step, the analysis determination notification unit 160 notifies the list of access right groups created in step S108, as candidates for an access right group to which the recipient of the message is to be added as a member, via the update processing unit 170, to the communication tool unit 120.

Here, in the notification, an interface for selecting an access right group to which the recipient is to be added and allowing the recipient to participate in the selected access right group is also notified together with the list of access right groups serving as candidates to which the recipient of the message is to be added. As mentioned above, the link determination sub-processing of step S100 ends.

Instead of the aforementioned description, step S102 may be carried out after step S106 and before step S200, or may be carried out after step S108 and before step S110. Furthermore, although the link determination sub-processing ends with notification processing being carried out in step S110, there are cases where the update processing of step S200 is carried out due to an instruction from a participant who has received the notification.

Figure 5:
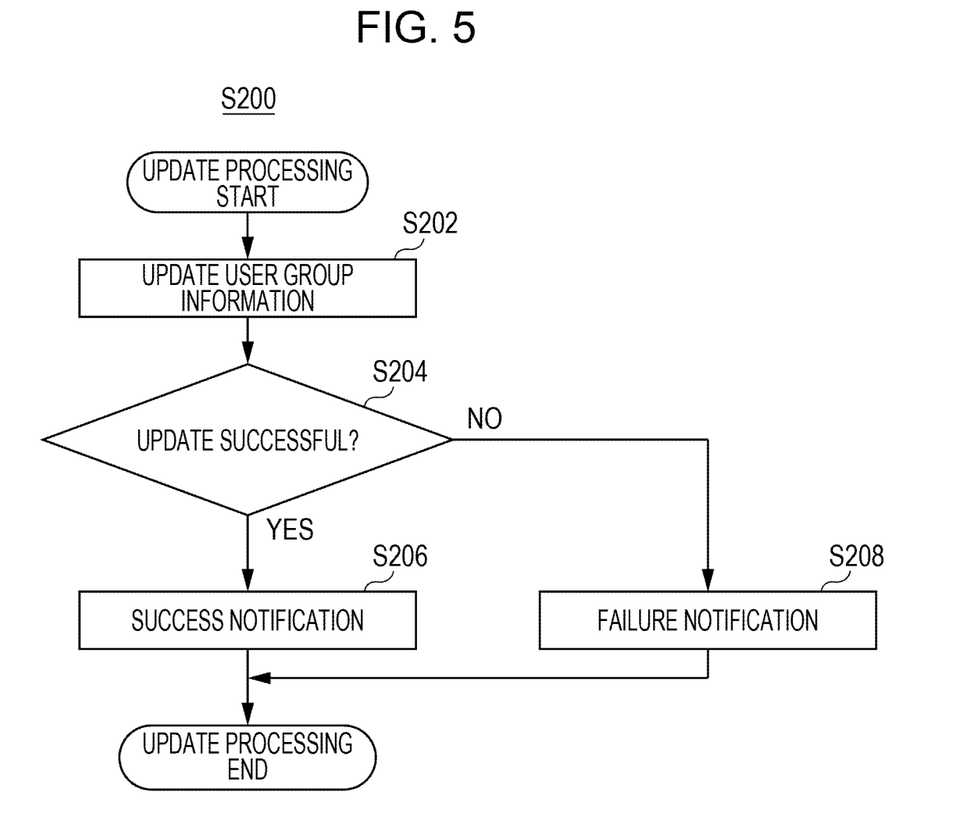
FIG. 5 is a flowchart depicting update processing of data carried out by an update processing unit.

FIG. 5 is a flowchart depicting the updating of data carried out by the update processing unit 170 brought about by an instruction issued by the analysis determination notification unit 160 in step S200. As depicted in FIG. 5, when the update processing is started, in step S202, the update processing unit 170 updates information regarding the access right groups managed by the user group information management unit 110, so that the participants of the message are allowed to participate in an access right group that has an access right to the file linked from the message.

In step S204 which is the next step, it is determined whether or not the update of access right group information in step S202 has succeeded. Processing then proceeds to step S206 in a case where the update has succeeded, and proceeds to step S208 in a case where the update failed.

In step S206, the communication tool unit 120, for example, notifies the sender and recipient of the message, for example, that the update of user group information has succeeded.

In step S208, the communication tool unit 120, for example, notifies the sender and recipient of the message, for example, that the user group update has failed.

Next, a specific example of information processing carried out by the information processing system 10 will be described. This specific example relates to a "new product project X", which is a project to develop a new product X. Also, in the new product project X, a collaboration system (hereinafter, referred to as collaboration system X) for the new product X installed in the communication tool unit 120 is used as a way for members to contact each other. Furthermore, in the new product project X, the file management system unit 130 is used to manage files such as document files, for example. Furthermore, FIG. 6 is a table depicting user groups managed by the user group information management unit 110 in this specific example.

Figure 6:
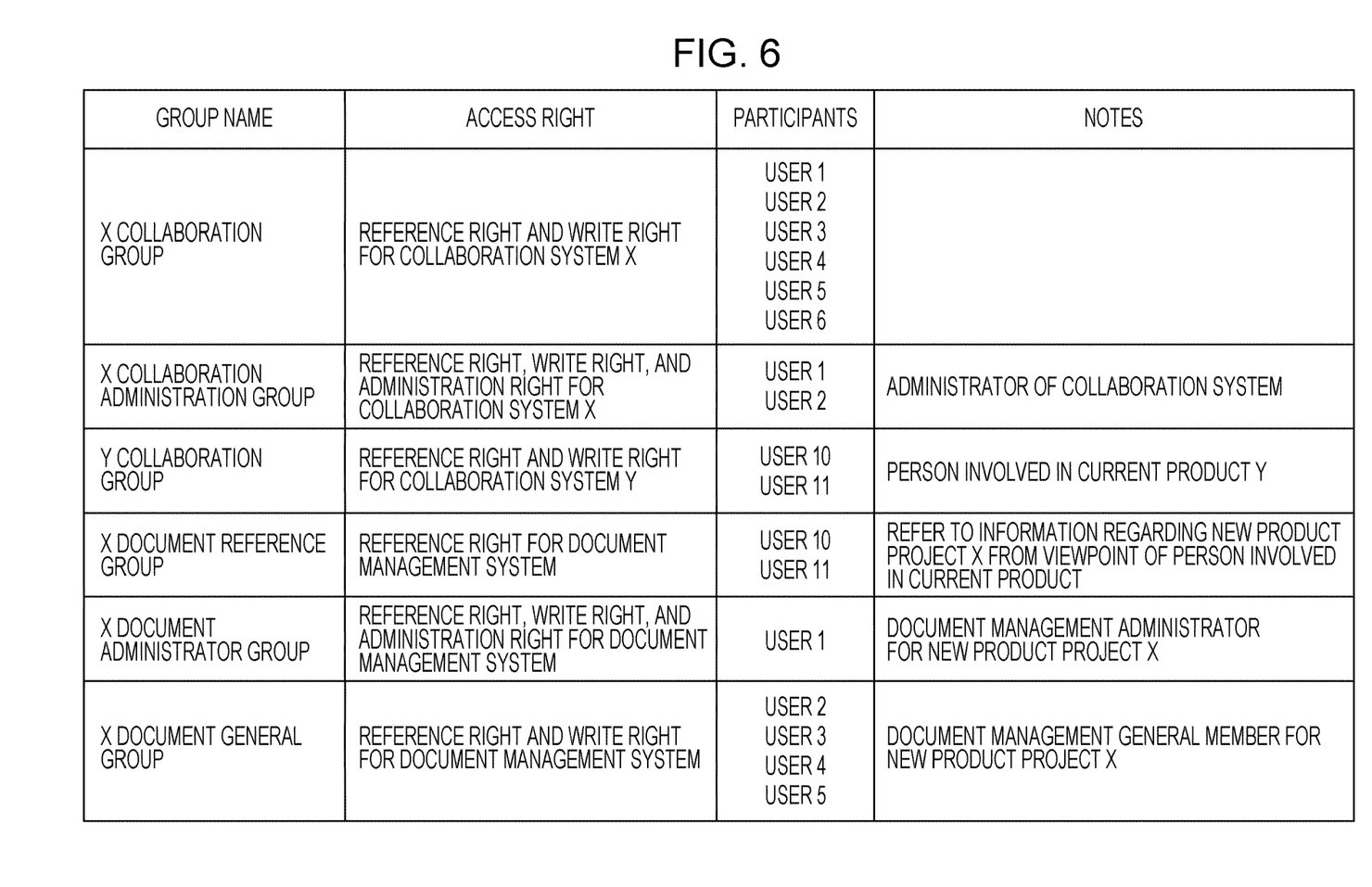
FIG. 6 is a table depicting an example of user groups managed by a user group information management unit.

As depicted in FIG. 6, the user group information management unit 110 is managing six groups. The first group, "X collaboration group", includes developers of the new product X, the specific participants are users 1, 2, 3, 4, 5, and 6, and each of the participants has a reference right for the collaboration system X and a write right for the collaboration system X as access rights.

The next user group, "X collaboration administration group", includes developers of the new product X, persons who are administrators of the collaboration system X and participate therein, and the specific users are users 1 and 2. Furthermore, each of the participants has a reference right for the collaboration system X and a write right for the collaboration system X, and additionally has an administration right for the collaboration system X, as access rights.

Furthermore, the next user group, "Y collaboration group", includes persons involved with product Y, which is a product developed prior to the new product X, the specific participants are users 10 and 11, and each of the participants has a reference right for a collaboration system (hereinafter, referred to as collaboration system Y) for a product Y installed in the communication tool unit 120 and a write right for the collaboration system Y. Furthermore, similar to the X collaboration group, the Y collaboration group also uses the file management system unit 130 to manage files such as document files.

Furthermore, the next group, "X document reference group", is an access right group, and, for example, includes persons who are not involved with the development of the new product X such as developers of product Y but who need to refer to a document relating to the new product X, the specific participants are users 10 and 11, and each of the participants has a reference right for the document relating to the new product X managed by the file management system unit 130 (hereinafter, referred to as X document).

Furthermore, the next group, "X document administrator group", is an access right group and includes administrators who manage the document relating to the new product X, the specific participant is user 1, and the participant, user 1, has a reference right for the X document and a write right for the X document, and additionally has an administration right for the X document, as access rights.

Furthermore, the next group, "X document general group", is an access right group and includes development members for the new product X, the specific participants are users 2, 3, 4, and 5, and each of the participants has a reference right for the X document and a write right for the X document.

Here, user 6 is a member who has become newly involved in the development of the new product X, and is already participating in the "X collaboration group", and therefore, as mentioned above, has a reference right and a write right for the collaboration system X. However, user 6 is not presently participating in the "X document general group". Therefore, user 6, despite being a development member for the new product X, does not have a reference right or a write right for files relating to the new product X managed by the file management system unit 130.

In the state described above, it is assumed that user 2, having saved file A, which is a file relating to the new product X, for example, in the file management system unit 130, uses the collaboration system X to transmit, to the participants of the X collaboration group, a message having the title "Resource Storage Notification" and including a link to file A, for example. In this case, users 1, 3, 4, 5, and 6, who are participants of the X collaboration group, are able to receive the message from user 2.

Then, user 1 who is a participant of the X document administrator group, and users 3, 4, and 5 who are participants of the X document general group have reference rights for file A, and are therefore able to refer to file A. However, user 6 is not participating in the X document administrator group or the X document general group, and therefore is not able to refer to file A. Hereinafter, a description will be given regarding processing carried out by the information processing system 10 that makes it possible for user 6 to refer to file A, with the message from user 2 serving as a beginning.

When user 2 transmits the message, the message is monitored by the communication monitoring unit 140, and, since a link to file A is included in the message, transmission information of the message transmitted by user 2 is stored in the monitoring information storage unit 150.

Next, the analysis determination notification unit 160 extracts information relating to the message transmitted by user 2 from the monitoring information storage unit 150, and, since the link to file A is a link to a file that is managed by the file management system unit 130, carries out link determination preliminary processing (step S100, see FIG. 4). In other words, since user 6 who is one recipient of the message does not have an access right to file A, the analysis determination notification unit 160 acquires the X document reference group, the X document administrator group, and the X document general group, which are all access right groups having an access right to file A, and acquires a list of participants in each of the access right groups.

It should be noted that, with regard to users 3, 4, and 5 who are recipients of the message, processing is not carried out to acquire a list of user groups since these users are participants in the X document general group. Furthermore, with regard to user 1 who is a recipient of the message, processing is not carried out to acquire a user group since this user is a participant in the X document administrator group.

Next, in relation to user 6, since multiple access right groups have been extracted, the monitoring information storage unit 150 sorts the extracted access right groups into descending order of the number of participants in the X collaboration group, which is the group to which user 2 transmitted the message.

Figure 7:
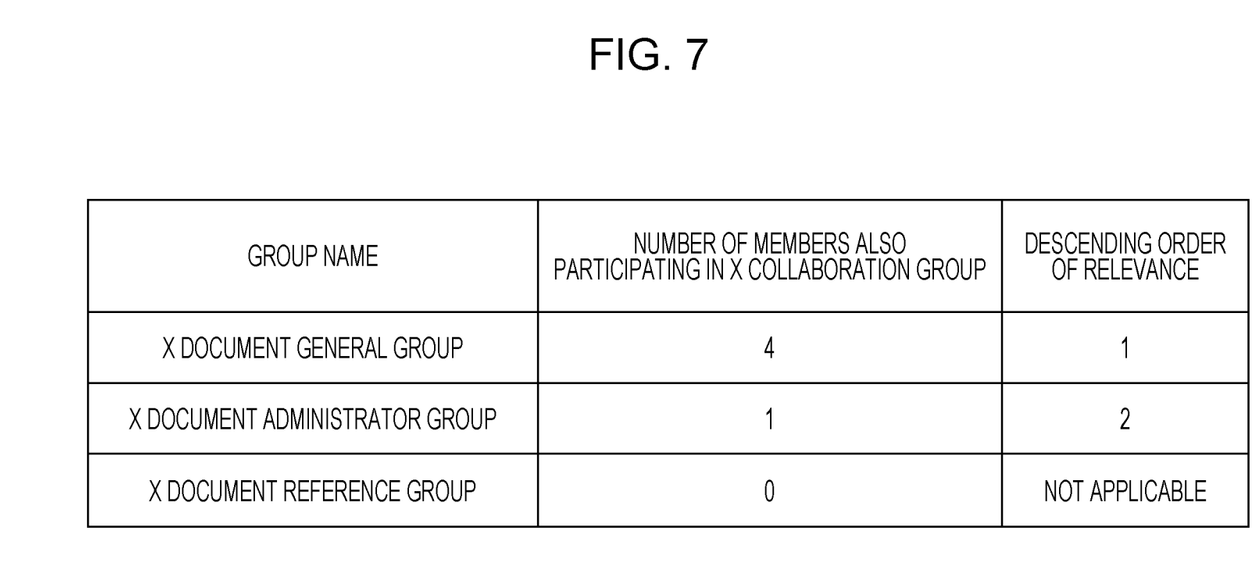
FIG. 7 is a table depicting the result of sorting user groups.

FIG. 7 is a table depicting the result of sorting the access right groups into descending order of the participants in the X collaboration group. As depicted in FIG. 7, with regard to the number of participants in the X collaboration group, there are four persons from the X document general group (the four persons of users 2, 3, 4, and 5), one person from the X document administrator group (the one person of user 1), and zero persons from the X document reference group. From this result, the analysis determination notification unit 160 determines that the X document reference group having zero participants in the X collaboration group is not a target. Furthermore, from the basis that relevance is high when an access right group has a large number of participants in the X collaboration group, the analysis determination notification unit 160 determines that the X document general group has the highest relevance to user 6, and determines that the X document administrator group has the second highest relevance to user 6.

Next, the analysis determination notification unit 160 notifies the list of access right groups that have been sorted in descending order of relevance to user 6, as candidates for an access right group to which user 6 may be added, to the collaboration system X installed in the communication tool unit 120. The notification issued to the collaboration system X can be referred to by all participants having a reference right for the collaboration system X, for example, and can be manipulated by the participants having a write right for the X collaboration group, for example.

Figure 8:
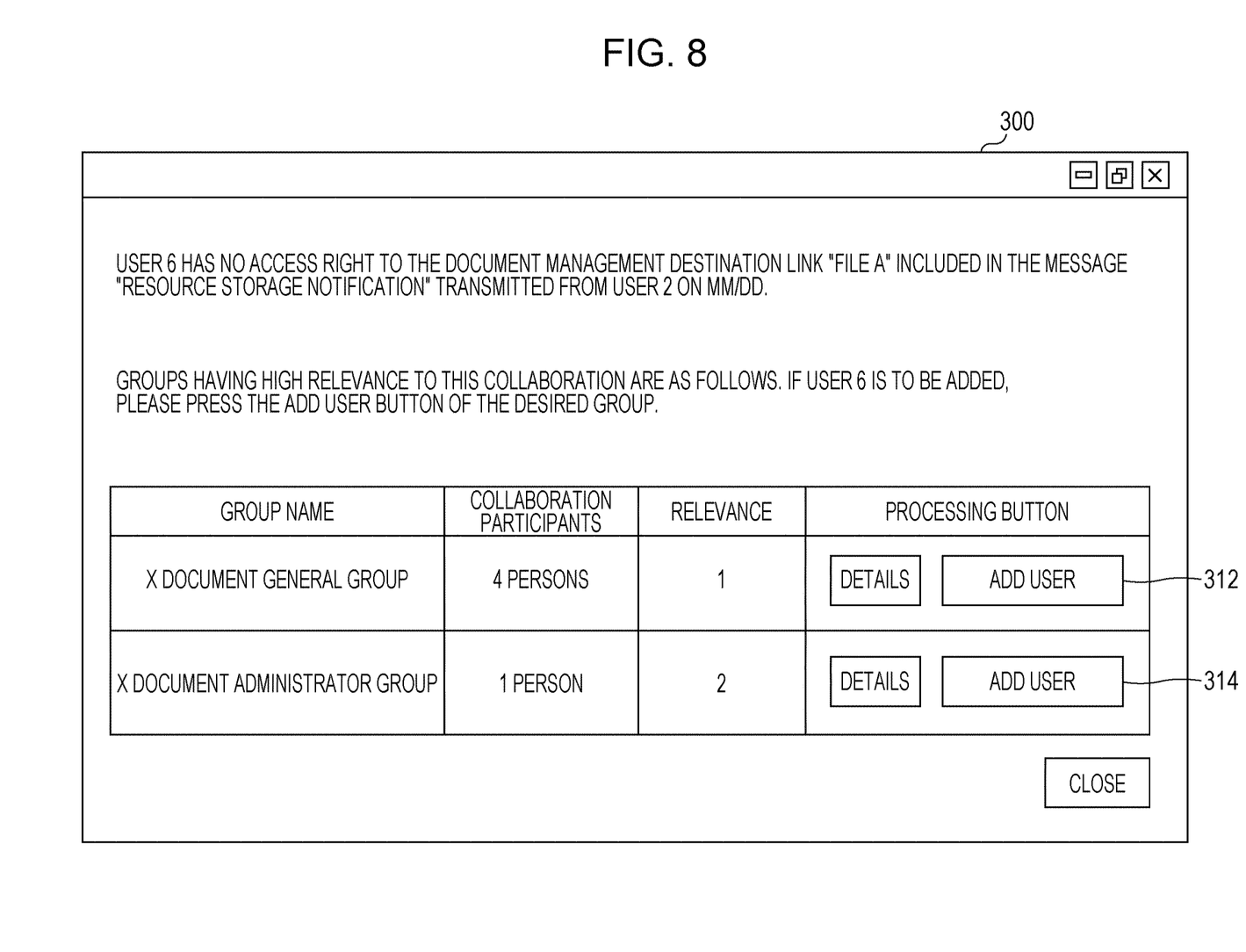
FIG. 8 is a drawing depicting an example of a notification to a communication tool unit.

FIG. 8 depicts a notification 300 which is an example of a notification from the analysis determination notification unit 160 to the collaboration system X. As depicted in FIG. 8, the notification 300 displays an explanation stating that "User 6 has no access right to the document management destination link "File A" included in the message "Resource Storage Notification" transmitted from user 2 on MM/DD", together with candidates for an access right group to which user 6 may be added. Furthermore, the notification 300 prompts user 6 to be added to the participants of a user group with the statement "Groups having high relevance to this collaboration are as follows. If user 6 is to be added, please press the add user button of the desired group".

Furthermore, notification 300 displays an operation button 312, which is an example of a user interface for adding user 6 to the X document general group which is an access right group, and displays an operation button 314, which is an example of an interface for adding user 6 to the X document administrator group which is an access right group.

Here, when a participant who has seen the notification presses the operation button 312 corresponding to the X document general group, the update processing unit 170 updates the information regarding the access right groups managed by the user group information management unit 110, so that user 6 is allowed to participate in the X document general group.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A data processing apparatus comprising:
 a processor, the processor being a hardware processor that is programmed to:
 monitor a message from a sender to a user group;
 in a case where the message includes a link to a file, extract one or more authorized user groups authorized to access the file;
 in a case where the user group that has received the message includes a user who is not authorized to access the file, update user group information to add the user to one or more of the one or more authorized user groups extracted;
 determine whether there is one authorized user group or whether there are two or more authorized user groups that have been extracted;
 when only one of the authorized user groups is extracted, update the user group information to add the user to the extracted one authorized user group; and
 when two or more of the authorized user groups are extracted, issue a notification for prompting selection of at least one of the authorized user groups to which the user is to be added.

2. The data processing apparatus according to claim 1, wherein, the processor is programmed to further notify levels of relevance between the extracted two or more authorized user groups and the user.

3. The data processing apparatus according to claim 2, wherein an authorized user group that includes more members of the user group is considered to have a higher level of relevance to the user.

4. The data processing apparatus according to claim 3, wherein the processor is programmed to issue the notification to the sender of the message.

5. The data processing apparatus according to claim 3,
wherein the processor is programmed to issue the notification to at least one member of the user group that has received the message.

6. The data processing apparatus according to claim 3,
wherein the processor is programmed to issue the notification to an administrator of the user group that has received the message.

7. The data processing apparatus according to claim 2,
wherein the processor is programmed to issue the notification to the sender of the message.

8. The data processing apparatus according to claim 2,
wherein the processor is programmed to issue the notification to at least one member of the user group that has received the message.

9. The data processing apparatus according to claim 2,
wherein the processor is programmed to issue the notification to an administrator of the user group that has received the message.

10. The data processing apparatus according to claim 1,
wherein the notification is issued to the sender of the message.

11. The data processing apparatus according to claim 1,
wherein the processor is programmed to issue the notification to at least one member of the user group that has received the message.

12. The data processing apparatus according to claim 1,
wherein the processor is programmed to issue the notification to an administrator of the user group that has received the message.

13. The data processing apparatus according to claim 1,
wherein the notification for prompting selection of the at least one of the authorized user groups includes a list of the authorized user groups.

14. The data processing apparatus according to claim 13,
wherein the processor is programmed to sort the authorized user groups in the list in descending order of a number of participants in each user group of recipients of the message.

* * * * *